(12) United States Patent
Wall

(10) Patent No.: US 8,326,041 B2
(45) Date of Patent: Dec. 4, 2012

(54) MACHINE CHARACTER RECOGNITION VERIFICATION

(76) Inventor: John Wall, Toronto (CA)

( * ) Notice: Subject to any disclaimer, the term of this patent is extended or adjusted under 35 U.S.C. 154(b) by 868 days.

(21) Appl. No.: 11/747,540

(22) Filed: May 11, 2007

(65) Prior Publication Data

US 2008/0279455 A1 Nov. 13, 2008

(51) Int. Cl.
*G06K 9/00* (2006.01)
(52) U.S. Cl. ........................................................ 382/187
(58) Field of Classification Search .................. None
See application file for complete search history.

(56) References Cited

U.S. PATENT DOCUMENTS

| | | | | |
|---|---|---|---|---|
| 3,634,822 | A * | 1/1972 | Chow | 382/228 |
| 5,805,747 | A | 9/1998 | Bradford | |
| 6,205,261 | B1 * | 3/2001 | Goldberg | 382/310 |
| 2006/0088199 | A1 * | 4/2006 | Shizuka et al. | 382/137 |
| 2007/0110322 | A1 * | 5/2007 | Yuille et al. | 382/227 |
| 2007/0172108 | A1 * | 7/2007 | Adelberg et al. | 382/139 |
| 2008/0101680 | A1 * | 5/2008 | Abernethy et al. | 382/139 |

OTHER PUBLICATIONS

Barclay, Tom et al., "TerraServer Bricks—A High Availability Cluster Alternative",Technical Report, MSR-TR-4004-107, Oct. 2004, pp. 1-21, Microsoft Research, Advanced Technology Division, Microsoft Corporation, Redmond, WA, USA. Available: <http://research.microsoft.com/pubs/64151/tr-2004-107>.

Devlin, Bill et al., "Scalability Terminology: Farms, Clones, Partitions, and Packs: RACS and RAPS", Technical Report, MS-TR-99-85, Dec. 1999, pp. 1-8, Microsoft Research, Advanced Technology Division, Microsoft Corporation, Redmond, WA, USA. Available: <http://arxiv.org/flp/cs/papers/9912/9912010.pdf>.

* cited by examiner

*Primary Examiner* — Matthew Bella
*Assistant Examiner* — Fred Hu
(74) *Attorney, Agent, or Firm* — Smart & Biggar

(57) ABSTRACT

Data on a document is recognized using at least two machine recognition processes. Data from one machine recognition process is used as reference data; data formed using the other recognition process is used as verification data. If the verification data matches the reference data, machine recognition may be verified. If the verification data does not exactly match the reference data, an assessment is made of the likelihood that the verification data is sufficiently close to the reference data to suggest an error in the verification data. This may be done by applying a fitness function to the verification data, to assess the likelihood that the verification data represents a mis-recognized version of the reference data. In one embodiment, the verification data is OCR data, and the reference data is MICR data.

19 Claims, 4 Drawing Sheets

| Keyed | Recognised | | | | | | | | | | |
|---|---|---|---|---|---|---|---|---|---|---|---|
| | | 0 | 1 | 2 | 3 | 4 | 5 | 6 | 7 | 8 | 9 |
| 0 | | 98.87 | 0.10 | 0.06 | 0.04 | 0.17 | 0.08 | 0.44 | 0.08 | 0.08 | 0.06 |
| 1 | | 0.14 | 98.96 | 0.32 | 0.01 | 0.25 | 0.01 | 0.07 | 0.13 | 0.06 | 0.05 |
| 2 | | 0.34 | 0.15 | 98.65 | 0.06 | 0.12 | 0.07 | 0.16 | 0.24 | 0.10 | 0.11 |
| 3 | | 0.26 | 0.10 | 0.41 | 97.89 | 0.13 | 0.42 | 0.09 | 0.17 | 0.35 | 0.17 |
| 4 | | 0.21 | 0.46 | 0.39 | 0.01 | 96.21 | 0.04 | 2.19 | 0.06 | 0.15 | 0.29 |
| 5 | | 0.60 | 0.16 | 0.16 | 0.17 | 0.19 | 97.99 | 0.33 | 0.16 | 0.19 | 0.04 |
| 6 | | 0.62 | 0.36 | 0.05 | 0.00 | 0.15 | 0.25 | 98.26 | 0.09 | 0.22 | 0.00 |
| 7 | | 0.25 | 0.51 | 0.54 | 0.06 | 1.20 | 0.08 | 0.06 | 96.58 | 0.09 | 0.62 |
| 8 | | 0.38 | 0.23 | 0.18 | 0.42 | 0.11 | 0.48 | 0.28 | 0.17 | 97.39 | 0.37 |
| 9 | | 0.61 | 0.28 | 0.06 | 0.20 | 0.44 | 0.14 | 0.13 | 0.25 | 0.15 | 97.75 |
| ? | | 17.70 | 7.08 | 10.62 | 7.96 | 10.62 | 13.27 | 8.85 | 5.31 | 14.16 | 4.42 |

FIG. 5

MACHINE CHARACTER RECOGNITION VERIFICATION

FIELD OF THE INVENTION

The present invention relates generally to document processing, and more particularly to a method, software and device for verifying machine character recognition.

BACKGROUND OF THE INVENTION

Since the 1960s many instruments, in paper form, exchanged by banks have been encoded using machine recognizable characters, for example those encoded with magnetic ink. Typically, characters representing bank branch, and account information are pre-printed in magnetic ink on the instrument. Other information, such as payee, and amount may also be printed on the instrument in magnetic ink, as required. Certified checks, for example, often include amount information, printed in magnetic ink, by a bank issuing branch. Magnetic ink characters are magnetically and optically recognizable.

Conveniently, magnetic ink characters lend themselves to machine recognition—referred to as magnetic ink character recognition (MICR). MICR still tends to be more accurate than optical character recognition (OCR).

Not surprisingly, magnetic ink characters are now also in use on other machine readable documents, such as invoices, passports, parking tickets and the like.

At present four fonts, MICR E-13B, CMC-7, OCR-A and OCR-B are commonly used to represent magnetic characters.

Notwithstanding the ease of recognition of the magnetic ink, errors do still occur. In particular, when documents are processed at very high speeds (many documents/second), machine recognition errors may occur. Additionally, when documents are further processed, such as by document image capture (which happens at a different processing point), the opportunity for MICR data to become misaligned with captured image(s) capture can occur. This may occur when documents are not-realigned properly, after a jam or similar disruption.

In recent years, modern document processing techniques further electronically image and archive paper documents for customer convenience and archival purposes. Conveniently, optical character recognition of portions of the images may be used to verify MICR data. Discrepancies between MICR and OCR data for the same characters may be flagged and resolved by operator intervention.

Unfortunately, OCR is also not 100% accurate. As such, OCR may introduce additional errors that will be flagged as OCR/MICR discrepancies. Individually, such errors may be tolerable. However, when significant numbers of documents are processed and unnecessarily flagged, document processing time and labour requirements are increased.

These problems are not unique to verification of MICR data with OCR data, but can also occur any time machine recognized data recognized using a first machine recognition process is verified using a second machine recognition process: are discrepancies in the verification a result of errors in the verification data or in the data being verified?

Accordingly, there is a need to more effectively verify machine data recognition.

SUMMARY OF THE INVENTION

In manners exemplary of an embodiment of the present invention, data on a document is recognized using at least two machine recognition processes. Data from one machine recognition process is used as reference data; data formed using the other recognition process is used as verification data. If the verification data matches the reference data, machine recognition is verified. If the verification data does not exactly match the reference data, an assessment is made of the likelihood that the verification data is sufficiently close to the reference data to suggest an error in the verification data. This may be done by applying a fitness function to the verification data, to assess the quality of match of the verification data to the reference data to assess a likelihood that the verification data represents a mis-recognized version of the reference data. In one embodiment, the verification data is OCR data, and the reference data is MICR data.

In accordance with an aspect of the present invention, there is provided a computer implemented method of verifying recognition of data encoded in a plurality of characters on a document. Each of the characters is recognizable using first and second machine character recognition processes. The method comprises: reading and recognizing each of the plurality of characters using the first machine character recognition process to form a corresponding first machine recognized character datum for each of the plurality of characters; reading and recognizing each of the plurality of characters using the second machine recognition process to form a corresponding second machine recognized character datum for each of the plurality of characters; for each of the characters determining a quality of match between the first machine recognized character datum and the second machine recognized character datum; determining a cumulative quality of match for the plurality of characters, based on the quality of match for each of the characters; identifying an error, if the cumulative quality of match fails to exceed a defined threshold.

In accordance with another aspect of the present invention, there is provided a computer implemented method of verifying recognition of magnetically encoded data encoded in a plurality of characters on a document, each of the characters magnetically and optically recognizable. The method comprises: optically imaging the plurality of characters; optically recognizing each of the imaged plurality of characters to form a corresponding optically recognized character datum; magnetically recognizing each of the plurality of characters to form a corresponding magnetically recognized character datum; for each of the characters determining a quality of match between the optically recognized character datum and the magnetically recognized character datum; determining a cumulative quality of match for the plurality of characters, based on the quality of match for each of the characters; identifying an error in the if the cumulative quality of match fails to exceed a defined threshold.

In accordance with another aspect of the present invention, there is provided a document processing system. The system comprises: a magnetic reader, for reading magnetic ink characters from a document comprising a plurality of characters, to form a magnetically recognized character datum for each of the characters; an imaging device for forming an electronic image of the document; an optical character recognition engine for optically recognizing the characters to form an optically recognized character datum for each of the characters; and a computing device, operable to determine a quality of match between the optically recognized character datum and the magnetically recognized character datum for the each of said characters; determine a cumulative quality of match for the plurality of characters, based on the quality of match for each of the characters; and identify an error, if the cumulative quality of match fails to exceed a defined threshold.

In accordance with yet another aspect of the present invention, there is provided a computer readable medium storing computer executable code, adapting a computing device to verify the magnetic recognition of a plurality of characters each of which is magnetically and optically recognizable, by optically recognizing each of the plurality of characters to form a corresponding optically recognized character datum; determining for each of the characters a quality of match between the optically recognized character datum and a magnetically recognized character datum, corresponding to magnetic recognition of the each of the characters; determining a cumulative quality of match for the plurality of characters, based on the quality of match for each of the characters; identifying an error if the cumulative quality of match fails to exceed a defined threshold.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

FIG. 5 is a table of probabilities, tabulating the likelihood of recognizing one character as another, used in the methods of FIGS. 3 and 4.

DETAILED DESCRIPTION

Figure 1:
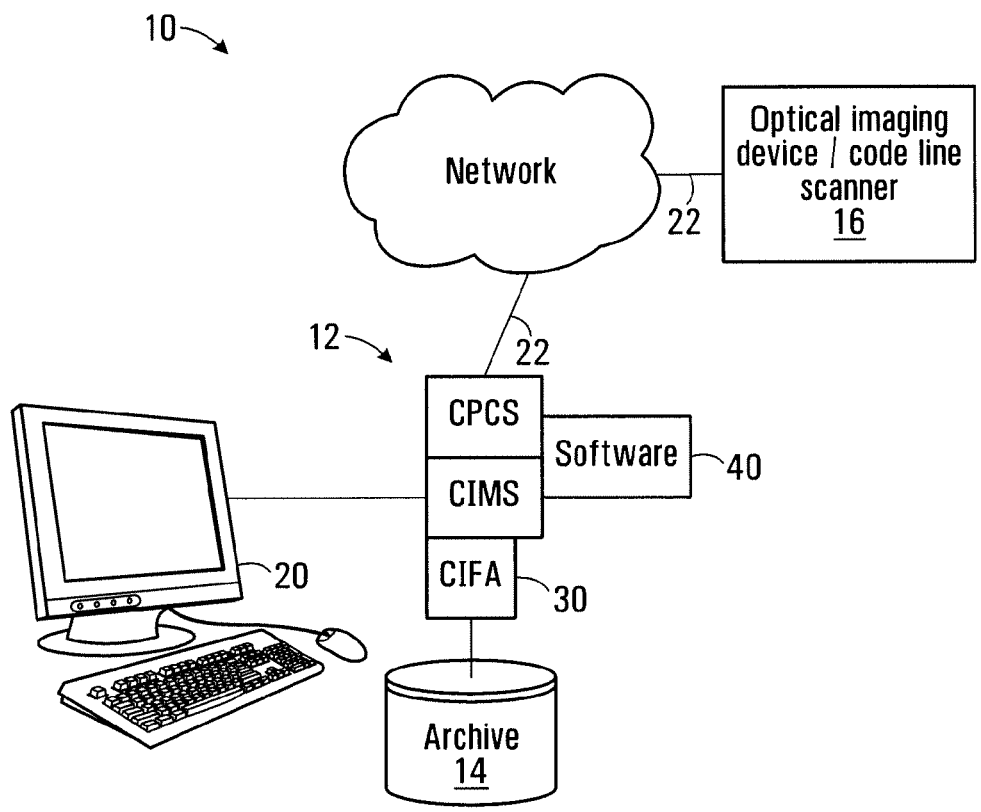
FIG. 1 is a schematic diagram of a document processing system, exemplary of an embodiment of the present invention.

FIG. 1 schematically illustrates a document processing system 10, exemplary of an embodiment of the present invention. As will become apparent, example document processing system 10 is suited for use in imaging, archival, and eventual clearance of negotiable instruments, and more particularly checks. However, as will be readily appreciated by a person of ordinary skill, the invention disclosed herein may readily be used to verify machine recognized characters on a wide variety of documents.

System 10 includes a host computing device 12 hosting an image archive 14. Computing device 12 is any suitable computing device, and includes a processor and storage memory. In the depicted embodiment, computing device 12 may take the form of a mainframe computing device, such as an IBM mainframe, RS6000 server, or the like. Computing device 12 stores and executes suitable software to maintain archive 14. Archive 14 may be an image archive that stores captured document images for processing, archival, retrieval, and other purposes. To this end, computing device 12 may include sufficient persistent storage memory in the form of magnetic, optical or other storage memory, and temporary storage memory, for example, in the form of random access or similar memory.

Suitable software 30 may also be hosted at computing device 12 to receive scanned data and store this in archive 14. For example software 30 may directly scan images, and MICR data. Suitable software 30 is for example commercially available from IBM under the trademark Check Image Management System (CIMS) in combination with check processing control system (CPCS) software. Further, software 40 adapting computing device 12 to operate in manners exemplary of embodiments of the present invention may also be stored at device 12. Other software not detailed herein, may also be hosted at computing device 12.

One or more imaging device(s) 16 is/are further in communication with computing device 12. Specifically, imaging device 16 is capable of optically imaging paper documents such as checks. To this end, device 16 may include a suitable optical camera, scanner or other imaging sensor. Imaging device 16 may further include a magnetic reader, suited to read code line data in the form of magnetic ink data evidencing particulars of the document (or transaction represented by the document).

For each document, imaging device 16 thus produces an image of the document (image data), and data representing the magnetic ink, as recognized (MICR data). The image data includes data representative of a captured document image, in a suitable image format. By way of example, suitable image formats include TIFF, JPEG, bitmaps, and other image formats known to those of ordinary skill. The data representing the magnetic ink may be provided as ASCII, EBCDIC, or other encoded data. The data representing the magnetic ink includes one datum corresponding to each recognized character, and suitable delimiters.

Imaging device 16 may take the form of high speed commercial document scanners, such as, for example NCR 7780, IBM 3890 XPE or similar imaging scanners.

Captured image data and MICR data are transferred by way of one or more links 22 to computing device 12 for storage of the data in archive 14. Link 22 can take the form of one or more data links across a private or public network such as the internet. Data along the link may or may not be encrypted. Alternatively, link 22 may be local and not make use of a network or other remote link.

MICR data and image data may be combined in a single package (e.g. data file, or related packets, or otherwise), along with other data understood by those of ordinary skill. Alternatively, MICR data and image data may be kept separate, and correlated after receipt.

Software 30 at computing device 12, allows data extracted from the documents to be received from device 16 over link 22, and stored within archive 14. Archive 14 may be any suitable electronic document archive. It may, for example, take the form of a relational or other database suitable for storing MICR data, image data, and other data related to each document.

Additionally, at least one operator terminal 20 is in communication with computing device 12 to allow operator intervention and manipulation of stored data associated with the image data. Terminal 20 may be any suitable terminal for displaying document images and associated data. As such, terminal 20 may be stand-alone computing device, such as a personal computer, or a suitable less capable terminal, such as an X-Windows terminal, or other terminal. In the depicted embodiment, terminal 20 is directly connected to computing device 12, but could alternatively be in communication with device 12, by way of a data network.

Figure 2:
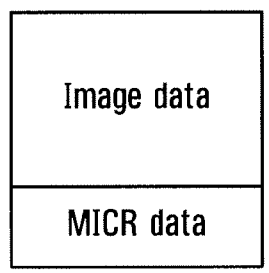
FIG. 2 is a block diagram illustrating an example format of image and MICR data in the system of FIG. 1.

In operation, imaging device(s) 16 capture(s) document image data and MICR data, for each document, and provides the data to computing device 12 by way of link 22 for storage in archive 14. The format of the captured image data and MICR data may be as depicted in the block diagram of FIG. 2. Once a suitable number of document images and data have been captured and archived at archive 14, software 40, exemplary of embodiments of the present invention may be executed in order to verify the accuracy of the document data, and more particularly the accuracy of the MICR data. In the depicted embodiment, example software 40 may be stored and executed at computing device 12, or may otherwise be executed at a computing device (not shown) in communication with archive 14.

Figure 3:
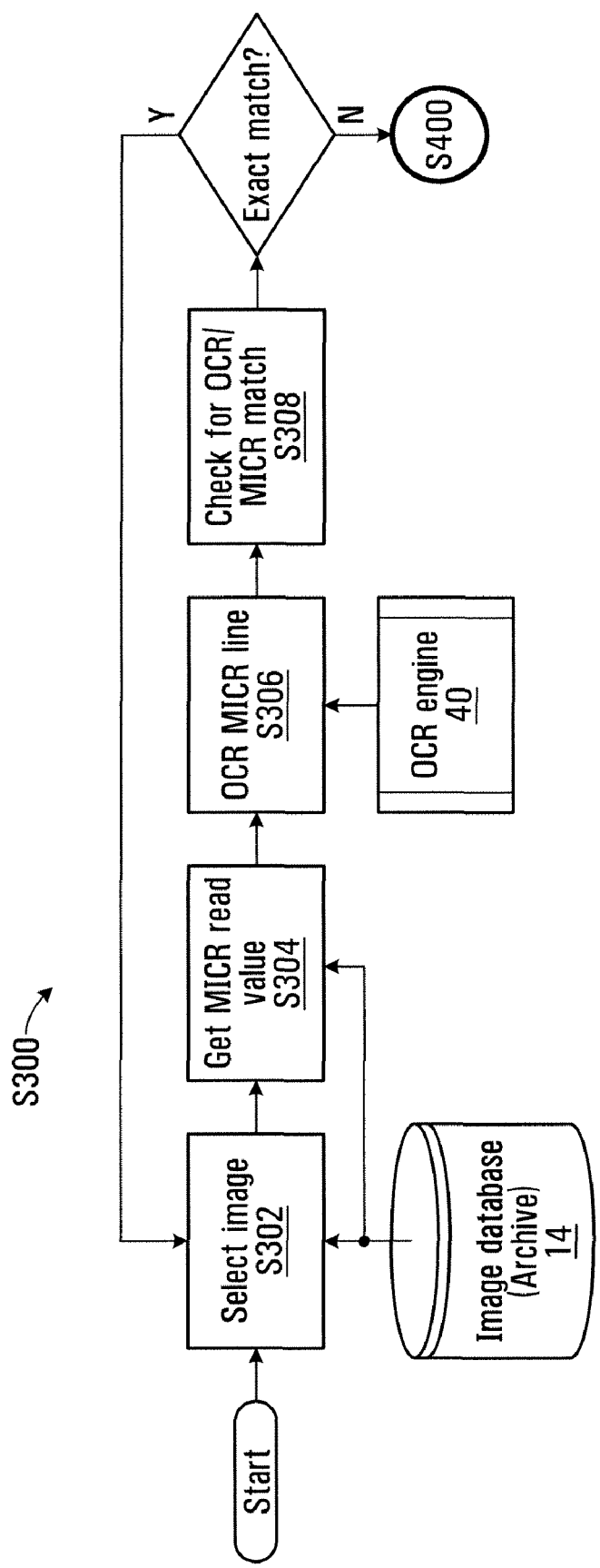
FIGS. 3 and 4 are flow charts of methods exemplary of embodiments of the present invention.
Figure 4:
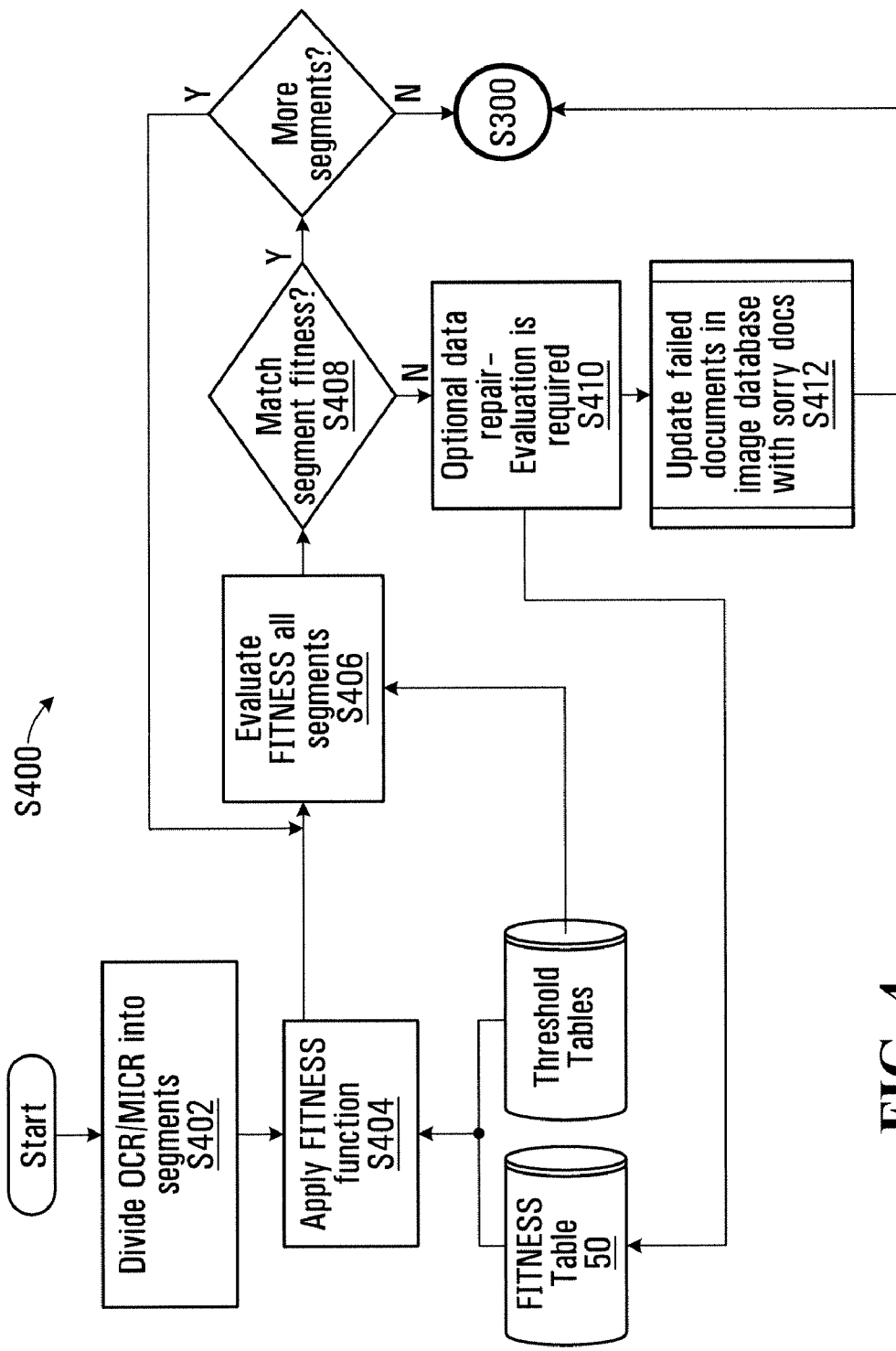

Steps S300 and S400 performed by exemplary software 40 are illustrated in flow chart in FIGS. 3 and 4. Software 40 may be written, at least in part, in a scripting language, or in a compiled or interpreting language such as Java, C, C++, C# or any other suitable development language using conventional programming tools known to those of ordinary skill. In the depicted embodiment, software 40 further includes an optical character recognition (OCR) engine, capable of converting an optical image into corresponding text. Example OCR engines include those made available in association with the trademarks Smart Reco, Tesseract, Mitek, and Orbograph.

As will become apparent, data as recognized by the OCR engine of software 40 ("OCR data") is used as verification data, to determine the accuracy of MICR data captured at device 16.

As illustrated, initially an image and MICR data associated with one document are extracted from archive 14, in steps S302 and S304. The image of the document is converted, at least in part, to text data by the OCR engine of software 40, in step S306 to produce OCR data. Optical character recognition includes extracting the zone of the image that contains the text of interest, identifying the font used (for example, for check MICR it is typically MICR 13b) and then processing the character extraction by calling an OCR function. Standard OCR functions understood by those of ordinary skill may be used by the OCR engine of software 40. Specifically, the portion of the document containing the magnetic ink characters is optically recognized to form OCR data in ASCII, EBCDIC or similar format. Conveniently, the OCR data may be the same format as the MICR data extracted at device 16.

Next, the produced OCR data is compared to the MICR data in step S308. If the OCR data matches the MICR data exactly as determined in step S310, the captured MICR data is considered accurate for the document, steps S302 and onwards are repeated for the next document image. A field within archive 14 may be set to indicate that the MICR data associated with the particular document has been verified. Optionally, the OCR data for the image may also be stored in association with the image data for the particular document.

If, however, the OCR data and MICR data for a document do not match exactly, steps S400 depicted in FIG. 4 are performed to determine whether manual intervention to correct any discrepancy is warranted, or whether the mismatch is acceptable.

Specifically, the MICR data and OCR data are divided into fields that are individually compared, in step S402. For example, for typical checks, the OCR/MICR data may be divided into fields, such as check number, bank transit institution number, account number and amount fields.

Next, for each segment a fitness function is applied in step S404, to determine the quality of match between the OCR data and the MICR data. Specifically, the fitness function attempts to estimate the probability of the mismatch is an OCR recognition error, rather than a true mismatch, suggesting a possible MICR problem. The MICR data is thus treated as the reference data, and an assessment is made whether there is likely an error in the reference data or the verification data (e.g. the OCR data). If the error is likely in the verification data, the error may be ignored.

This may be done by estimating a probability of erroneous recognition for each of the characters in step S404, based on the OCR datum and the corresponding MICR datum for that character. Specifically, the probability of misrecognizing any OCR character as a particular other character, may be tabulated. As will become apparent, the table may be used to determine whether any OCR/MICR mismatch is likely to result from a mere OCR error. For example, for most fonts, the likelihood of recognizing a "7" as a "1" may be high, while the likelihood of recognizing a "7" as a "6" may be quite low. Accordingly, an OCR datum identifying a character "7" associated with an MICR datum identifying the character as "1" would be assigned a high quality of match (suggesting likely OCR error), while an OCR datum identifying a character "7" associated with an MICR datum identifying the character as "6" would be assigned a low quality of match (suggesting possible MICR error).

A specific table 50 illustrating probabilities of optically recognizing a given character as another character for various characters is depicted in FIG. 5. Table 50 may form part of software 40, or be stored separately at device 12.

Table 50 may be empirically tabulated, by performing a statistically significant number of recognitions of individual characters, using the machine recognition source producing the verification data. As will be apparent, the content of table 50 may vary depending on a large number of factors, including: the OCR algorithm used; the number of different characters to be recognized (i.e. the size of the alphabet being recognized); the font being used; the hardware being used; and other factors appreciated by those of ordinary skill.

Optionally, multiple quality of match tables, like table 50, for multiple fonts, alphabets or the like, could be stored at device 12. As such, device 12 could initially assess the font/alphabet being used prior to performing steps S404 and onward, for a more particular document to more accurately determine a quality of match of the OCR data.

Now, the probability of any mismatch being the result of an error in the verification data (e.g. an OCR error) is performed for each character in the field in step S404. As table 50 indicates, any accurate recognition of a character is assigned a match metric of near "1", while improbable recognition, suggesting a true MICR/OCR discrepancy, is assigned a match metric near "0" (e.g. 0.01-0.1). A plausible OCR error is assigned a match metric somewhere therebetween (e.g. between 0.1 and near 1). To arrive at a cumulative fitness value for a segment, the match metrics may be combined for several characters. A simple cumulative metric for a segment may, for example, be formed by multiplying the likelihood of OCR match for each character in the segment. Alternatively, they could be summed, or otherwise combined.

Next, the cumulative quality of match for each segment is compared to provide threshold values in step S406. If the cumulative quality of match is sufficiently high to suggest an OCR error for any segment, the errors are assumed to be errors in the verification data—e.g. OCR errors—and no correction or further evaluation is necessary. Threshold values for each segment may also be stored at device 12. Thresholds may be set by segment or may be set by character. A threshold is the minimum value of the cumulative quality of match metric that reflects an acceptable degree of mis-recognition for characters within a segment. That is, for any segment, it reflects the acceptable number and quality of characters for which MICR data need not match OCR data. Conveniently, choice of an appropriate threshold allows detection of a variety of errors. For example, an overlap of a signature or other writing on the machine printed document may be detected; misalignment of verification data to reference data may be detected; imaging errors may detected; and the like.

In the event the cumulative quality of match value of the OCR data to the MICR data does not exceed the threshold for at least one segment in the image of the document and associated MICR data may be presented at terminal 20 in step S410, allowing an operator to evaluate the MICR data associated with the document, and either verify its accuracy or manually update the data, in step S412. Specifically, the operator may be presented with the image of the document, or a portion thereof, as contained in the image data and the MICR data, so that human judgment may be applied to determine if the MICR data is or is not accurate. Again, optionally, the OCR data may be presented, and also verified and/or corrected by the operator.

Steps S300 and S400 may be repeated for all, or selected documents within the image archive.

Conveniently steps S300 and S400 may be formed as documents are being machine recognized (i.e. imaged, or magnetically read), or in batches after image data and MICR data for multiple documents have been determined/stored.

As will now be apparent, use of steps S300 and S400 reduces the need for operator intervention significantly. Instead of requiring operator intervention for each and every document for which there is an MICR/OCR discrepancy, only those documents for which the discrepancy represents a probable MICR error, (i.e. for which the likelihood of OCR error is low and therefore the likelihood of MICR error is high) is provided to an operator. Thresholds may be set by operators/administrators in order to achieve accuracy, while reducing user intervention. As required, stored thresholds may be adjusted downwardly or upwardly to achieve a desired accuracy and degree of operator intervention.

As will be appreciated, although the above described embodiments operate on previously archived data, methods exemplary of embodiments of the present invention could be performed on buffered images and MICR data not yet stored in archive 14. For example, freshly captured MICR data and images or OCR data may be buffered in a first in, first out buffer (not shown) as they are captured. Buffered MICR data may be verified and/or corrected prior to addition to archive 14.

More generally, although the above described embodiments have been described in the context of verifying MICR data recognition using OCR, methods and software exemplary of embodiments of the present invention may easily be used to verify machine recognition of characters using a second machine recognition source. That is, data from a first recognition source may be verified using a second recognition source. If one or more characters in the data from the second (verification) recognition source does not match the data from the first (reference) recognition source, an assessment may be made of the likelihood that the error is in the data from the first (reference) source or the data from the second (verification) source, by determining a likelihood that the second recognition source has mis-recognized data properly recognized by the first (reference) recognition source. Again, this may be done by calculating a quality of match between data from the first recognition source and the second recognition source, and identifying an error if the quality of match does not exceed some threshold.

Similarly, methods exemplary of embodiments the present invention could be used to verify and/or correct data derived from machine recognized characters that are machine recognized using two or more recognition techniques. For example, OCR data for an image recognized using a second OCR process may be used to verify OCR data for the image from a first OCR process. Each process could use the image data from the same imaging source, or could use two separate imaging devices. Similarly, instead of comparing OCR data to MICR data, data from a first machine recognition process such as an optical barcode reading/recognition, RFID reading, mechanical mark reading, OCR, MICR or the like could be compared to data from another machine recognition source, such as another optical barcode reading/recognition process, RFID reading, mechanical mark reading, OCR, MICR, or other machine recognition source known to those of ordinary skill. Data from the two recognition sources may be compared to establish a quality of match for each character, originating from the two sources to assess an overall quality of match, for several characters in the text of interest. Quality of match metrics for either of the two sources may be tabulated. Again, if the cumulative quality of match does not exceed a pre-defined threshold, an actual image of the document and data from one or more of the machine recognition sources may be presented to a user for verification and/or correction.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. A computer implemented method of verifying recognition of magnetically encoded data encoded in a plurality of characters on a document, each of said characters magnetically and optically recognizable, said method comprising:
   optically imaging said plurality of characters;
   optically recognizing each of said imaged plurality of characters to form a corresponding optically recognized character datum;
   magnetically recognizing each of said plurality of characters to form a corresponding magnetically recognized character datum;
   for each of said plurality of characters determining a numerical quality of match between said optically recognized character datum and said magnetically recognized character datum representing a numerical probability of having optically recognized that character as said magnetically recognized character datum, determined for each of said plurality of characters using a tabulated numerical probability of optically recognizing that character as another character;
   calculating a cumulative quality of match representing a joint probability of having optically recognized each particular said character as said magnetically recognized character datum, for all of said plurality of characters, from said numerical quality of match for all of said plurality of characters;
   wherein said cumulative quality of match for said plurality of characters, is calculated by multiplying said numerical quality of match for each of said characters; and
   identifying an error if said cumulative quality of match fails to exceed a defined threshold.

2. The method of claim 1, wherein said plurality of characters form a field on said document.

3. The method of claim 1, wherein said document comprises a check.

4. The method of claim 2, wherein said field represents one of a check number, bank transit institution number, account number and amount fields.

5. The method of claim 4, further comprising storing a tabulated numerical probability of optically recognizing any particular character as another character.

6. The method of claim 1, further comprising presenting an image of said document to an operator if said cumulative quality of match fails to exceed a defined threshold.

7. The method of claim 6, further comprising presenting magnetically recognized data for said document to said operator for correction or verification.

8. The method of claim 5, further comprising storing a probability of optically misrecognizing any particular character as another character in a plurality of tables, and selecting one of said plurality of tables in dependence on the font of said characters.

9. A document processing system, comprising:
- a magnetic reader, for reading magnetic ink characters from a document comprising a plurality of characters, to form a magnetically recognized character datum for each of said characters;
- an imaging device for forming an electronic image of said document;
- an optical character recognition engine for optically recognizing said characters to form an optically recognized character datum for each of said characters; and
- a computing device operable to:
  - for each of said plurality of characters determine a numerical quality of match between said optically recognized character datum and said magnetically recognized character datum representing a numerical probability of having optically recognized that character as said magnetically recognized character datum, determined for each of said plurality of characters from a tabulated numerical probability of optically recognizing that character as another character;
  - calculate a cumulative quality of match representing a joint probability of having optically recognized each particular said character as said magnetically recognized character datum, for all of said plurality of characters, from said numerical quality of match for all of said plurality of characters;
  - wherein said cumulative quality of match for said plurality of characters, is calculated by multiplying said numerical quality of match for each of said characters; and
  - identify an error, if said cumulative quality of match fails to exceed a defined threshold.

10. The system of claim 9, further comprising an archive in communication with said computing device for storing said image of said document.

11. The system of claim 10, further comprising an operator terminal for presenting said image of said document to an operator if said cumulative quality of match fails to exceed a defined threshold.

12. The system of claim 11, further comprising a data network interconnecting said magnetic reader and said imaging device to said computing device.

13. The system of claim 9, wherein said computing device further stores a table containing probabilities of optically recognizing any particular character as another character.

14. A non-transitory computer readable medium storing computer executable code, adapting a computing device to verify the magnetic recognition of a plurality of characters each of which is magnetically and optically recognizable, by
- optically recognizing each of said plurality of characters to form a corresponding optically recognized character datum;
- determining for each of said characters a numerical quality of match between said optically recognized character datum and a magnetically recognized character datum, corresponding to magnetic recognition of said each of said characters representing a numerical probability of having optically recognized that character as said magnetically recognized character datum, determined for each of said plurality of characters using a tabulated numerical probability of optically recognizing that character as another character;
- calculating a cumulative quality of match representing a joint probability of having optically recognized each particular said character as said magnetically recognized character datum, for all of said plurality of characters, from said numerical quality of match for all of said plurality of characters;
- wherein said cumulative quality of match for said plurality of characters, is calculated by multiplying said numerical quality of match for each of said characters; and
- identifying an error if said cumulative quality of match fails to exceed a defined threshold.

15. A computer implemented method of verifying recognition of data encoded in a plurality of characters on a document, each of said characters recognizable using first and second machine character recognition processes, said method comprising:
- reading and recognizing each of said plurality of characters using said first machine character recognition process to form a corresponding first machine recognized character datum for each of said plurality of characters;
- reading and recognizing each of said plurality of characters using said second machine recognition process to form a corresponding second machine recognized character datum for each of said plurality of characters;
- for each of said characters determining a numerical quality of match between said first machine recognized character datum and said second machine recognized character datum representing a numerical likelihood of having recognized that character using said second machine recognition process as said first machine recognized character datum, determined for each of said plurality of characters from a tabulated numerical probability of having recognized that character as another character using said second machine recognition process;
- calculating a cumulative quality of match representing a joint probability of having recognized each particular said character using said second machine recognition process as said first machine recognized character datum, for all of said plurality of characters, from said numerical quality of match for all of said plurality of characters;
- wherein said cumulative quality of match for said plurality of characters, is calculated by multiplying said numerical quality of match for each of said characters; and
- identifying an error, if said cumulative quality of match fails to exceed a defined threshold.

16. The method of claim 15, further comprising storing a probability of misrecognizing any particular character as another character using said first machine recognition process.

17. The method of claim 15, wherein said first machine recognition process comprises optical character recognition and said second machine recognition process comprise optical character recognition.

18. The method of claim 15, wherein said first machine recognition process comprises optical barcode recognition, RFID recognition, mechanical mark recognition, OCR recognition, MICR recognition, and said second machine recognition process comprises optical barcode recognition, RFID recognition, mechanical mark recognition, OCR recognition, MICR recognition.

19. A non-transitory computer readable medium storing computer executable code, adapting a computing device to perform the method of claim 15.

* * * * *